United States Patent [19]
Hermann et al.

[11] Patent Number: 6,007,941
[45] Date of Patent: Dec. 28, 1999

[54] WATERTIGHT BATTERY COMPARTMENT COVER WITH LATCH ACTUATED O-RING SEAL

[75] Inventors: Robert A. Hermann, Chula Vista; Michael W. Lawless, Poway; Peter A. Soberon, San Diego, all of Calif.

[73] Assignee: Abbott Laboratories, Abbott Park, Ill.

[21] Appl. No.: 09/100,370

[22] Filed: Jun. 19, 1998

[51] Int. Cl.[6] .................................................. H01M 2/10
[52] U.S. Cl. ............................... 429/99; 429/96; 429/100
[58] Field of Search ................... 429/100, 96, 99

[56] References Cited

U.S. PATENT DOCUMENTS

| | | | |
|---|---|---|---|
| 5,187,746 | 2/1993 | Narisawa | 429/100 X |
| 5,270,702 | 12/1993 | Krolak | 429/100 X |
| 5,538,807 | 7/1996 | Hagiuna | 429/100 |

*Primary Examiner*—John S. Maples
*Attorney, Agent, or Firm*—Neal D. Marcus

[57] ABSTRACT

A cover for a battery compartment in a medical device such as an ambulatory pump that is used for infusing a medicinal fluid. The battery compartment cover includes a lever that is pivotal between an open and a closed position. The lever is connected to a plunger that applies a compressive force against an O-ring, which is trapped between a shoulder on a washer through which the plunger extends and an end of the plunger. When the lever is pivoted to its open position, the compressive force on the O-ring is released, enabling the battery compartment cover to be removed from the opening into the battery compartment. However, when the lever is pivoted to its closed position, it draws the plunger outwardly, applying a compressive force to the O-ring that causes the O-ring to expand radially outward, sealing the opening into the battery compartment against the intrusion of water or other liquids and securing the battery compartment cover in engagement with the opening.

21 Claims, 3 Drawing Sheets

WATERTIGHT BATTERY COMPARTMENT COVER WITH LATCH ACTUATED O-RING SEAL

FIELD OF THE INVENTION

The present invention generally relates to a cover for a compartment within a housing, and more specifically, to an easily removable cover for sealing a battery compartment within a portable housing.

BACKGROUND OF THE INVENTION

Many portable electrically powered devices use electrical storage batteries as a source of electrical current to energize electronic circuitry and electrical motors included in the devices. The batteries are typically disposed within a battery compartment formed in a housing or enclosure of the device. It is common to secure the batteries in a battery compartment of a portable device with a cover having tabs disposed along its periphery that engage the sides of the compartment opening or fit into slots disposed adjacent the edges of the opening. Since housings and battery compartment covers are frequently made of plastic to ensure low cost and light weight, it is not uncommon for the tabs on the battery cover to break with usage or become ineffective in securing the cover in place.

For some types of portable devices, it is important that the housing be either watertight, or at least water resistant. A simple snap-in-place battery compartment cover is generally not capable of providing even a water resistant seal. One solution to this problem is to use a cover that is threaded into mating helical threads formed in the opening of the battery compartment and which includes an "O-ring" that is compressed when the cover is tightened, to form a watertight or at least a water resistant seal. However, threaded covers are much less convenient to remove and replace than snap-in-place battery compartment covers. In addition, some types of plastic used for housings do not have the proper friction characteristics to perform well when threaded into engagement with a mating threaded part. Accordingly, it would be desirable to provide a cover for a battery compartment that effects a watertight seal with a housing, but which is readily removed and resealed following servicing of the batteries. Such a cover should preferably be formed of plastic or other low cost material, but should not be easily broken.

A specific application for such a cover exists in connection with sealing a battery compartment in an ambulatory infusion pump. Because some users may need to use the infusion pump in wet environments, e.g., while taking a shower or bathing, it is important that the housing be watertight. Prior art ambulatory infusion pumps have not provided a watertight seal for the battery compartment and thus have enabled water to leak into the interior of the housing, causing damage to internal electronic circuitry and components. A need for a simple, easily usable watertight battery compartment cover has led to the development of the present invention. No prior art battery compartment cover is known that meets all of the requirements noted above.

SUMMARY OF THE INVENTION

In accord with the present invention, a battery compartment cover is defined for sealing an opening into a battery compartment formed in a housing of a portable battery powered device. The cover includes a supporting member having an inner portion shaped and sized to fit within the opening into the battery compartment. An outer portion of the cover is shaped and sized to overlie the opening into the battery compartment. Disposed within the outer portion and extending into the inner portion of the supporting member is an aperture. An elastomeric seal is disposed around the inner portion of the supporting member. A plunger is shaped and sized to fit within the opening into the battery compartment and has a shoulder disposed at one end. This shoulder is sized to abut against one side of the elastomeric seal. A tab is also disposed on that end of the plunger, surrounded by the shoulder. The tab extends through the aperture, from the inner portion to the outer portion of the supporting member. A lever is pivotally coupled to the tab and is rotatable between a first position and a second position. Rotation of the lever from the second position to the first position draws the tab and the plunger toward the outer portion of the supporting member. Thus, when the battery compartment cover is disposed within the opening of the battery compartment and the lever has been rotated to the first position, the elastomeric seal is compressed between the shoulder and the outer portion of the supporting member, causing the elastomeric seal to expand radially outward within the opening, forming a substantially watertight seal between the inner portion of the supporting member and the opening into the battery compartment. When the lever is rotated from the first position to the second position, the force applied by the shoulder against the elastomeric seal is substantially reduced, enabling the battery compartment cover to be readily removed from the opening into the battery compartment.

The battery compartment cover also includes a spring disposed on an end of the plunger opposite that on which the tab is disposed. This spring provides an electrical contact adapted to engage a terminal of a battery when the plunger is disposed within the opening of the battery compartment. An electrical wiper is mechanically and electrically coupled to the spring; the electrical wiper extends to a periphery of the plunger and is adapted to electrically couple with a terminal on the housing of the portable battery powered device when the plunger is inserted within the opening. Also included is a fastener that connects the electrical wiper and the spring to the plunger.

Preferably, a flexible tether is coupled to the plunger and is adapted to connect to an interior point within the battery compartment. The flexible tether secures the battery compartment cover to the housing to prevent the battery compartment cover from being inadvertently misplaced, but permits the battery compartment cover to be removed to access the interior of the battery compartment, to facilitate removing or inserting a battery therein.

A pivot pin preferably extends through the lever and through the tab forming a pivot joint. In a preferred form of the invention, the elastomeric seal comprises an elastomeric O-ring. The shoulder of the plunger has an external diameter about equal that of the O-ring when the O-ring is not being compressed against the outer portion of the supporting member by the shoulder.

When in the second position, the lever is generally aligned with a longitudinal axis of the plunger, while when in the first position, the lever is generally transverse to the longitudinal axis. A surface of the lever rides against a surface of the outer portion of the supporting member as the lever is rotated between the first position and the second position. A distance between a center of rotation of the lever and a point on the surface of the lever (that rides on the surface of the outer portion of the supporting member increases as the lever is rotated from the second position to the first position. Compression of the elastomeric seal by the shoulder of the plunger produces a force that is transmitted through the tab to the plunger.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
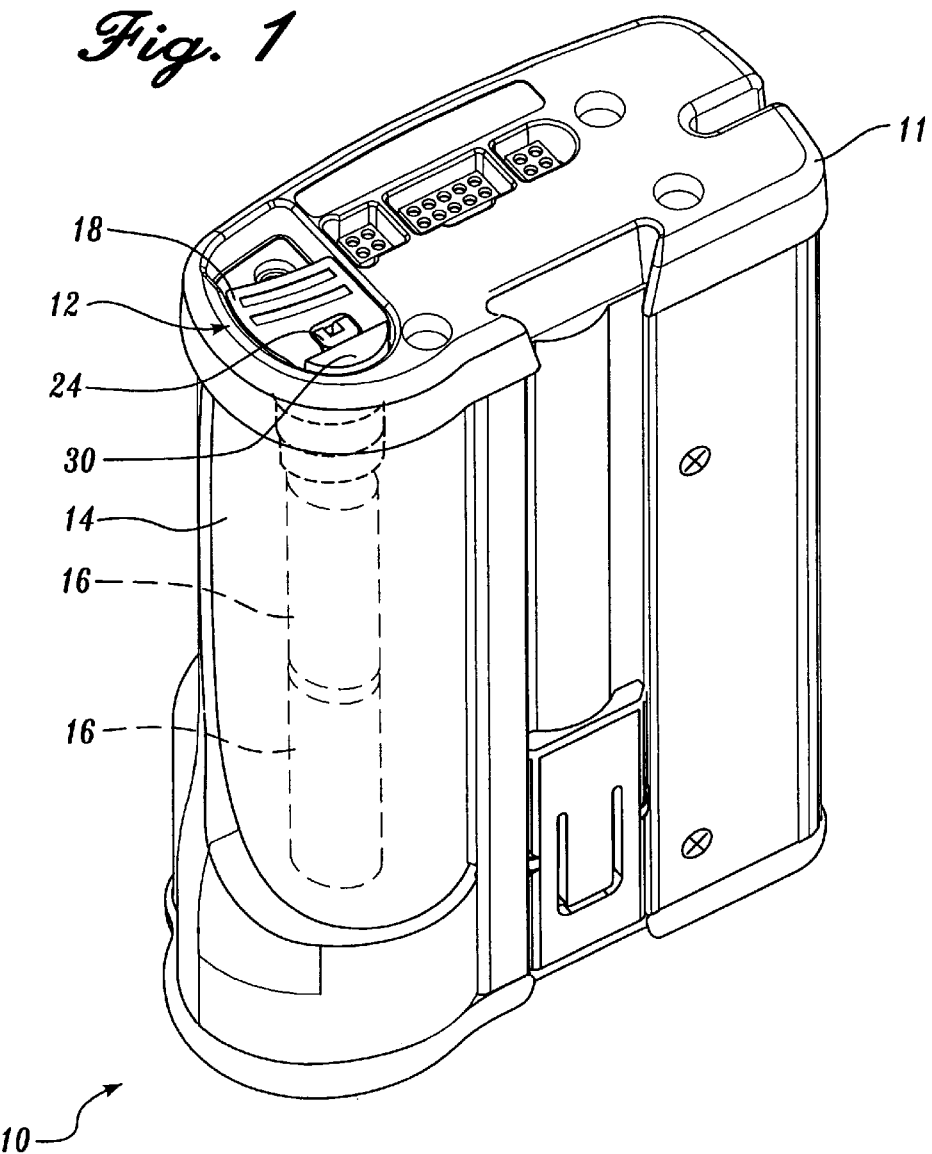
FIG. 1 is an isometric view of a bottom of a portable infusion pump, showing batteries (phantom view) disposed within a battery compartment that is sealed by the present invention.
Figure 2:
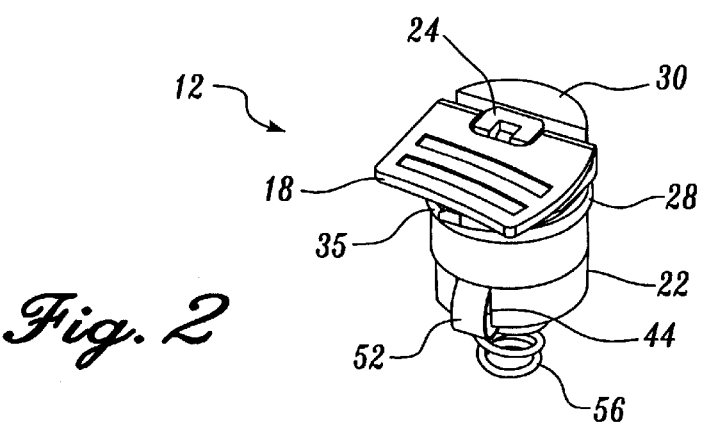
FIG. 2 is an isometric view of a battery compartment cover in accord with the present invention.
Figure 3:
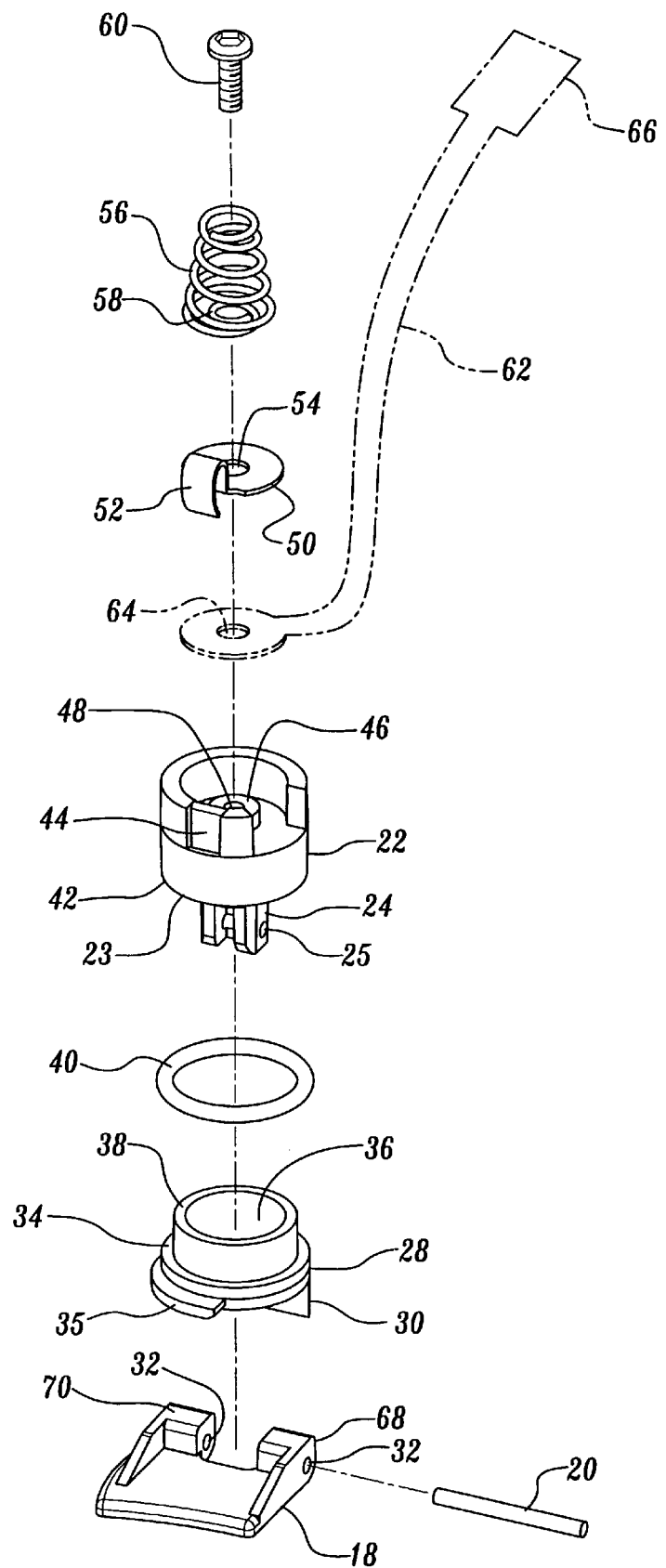
FIG. 3 is an exploded isometric view of the battery compartment cover, showing an optional tether (phantom view) for securing the cover to the portable infusion pump.
Figure 4:
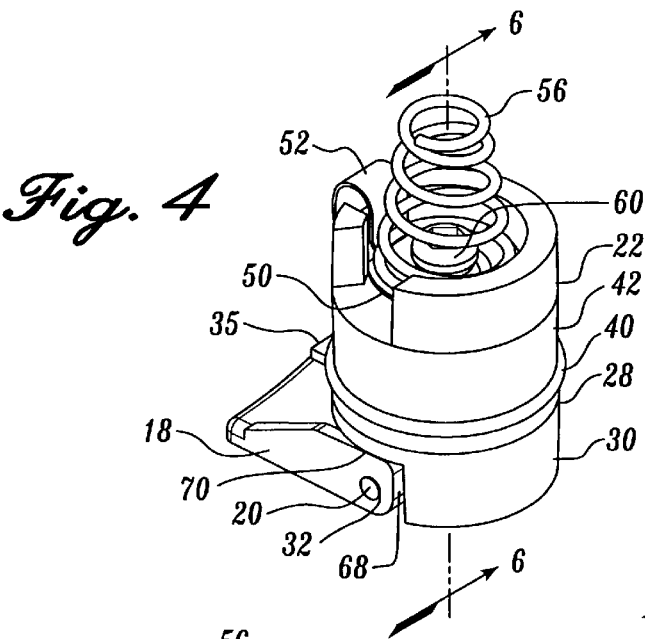
FIG. 4 is an isometric view of the battery compartment cover.

FIG. 1 illustrates a pump 10 that is intended to be ambulatory for use in infusing a medicinal fluid into a patient (not shown). Since pump 10 must at times be carried about by the patient, it is provided with a battery compartment 14 in which batteries 16 are inserted to provide electrical power to the pump for energizing a direct current (DC) motor (not shown) that causes the pump to infuse the medicinal liquid. A battery compartment cover 12 seals battery compartment 14 so that water or other liquids will not enter the battery compartment. A liquid-tight seal on the battery compartment is important on pump 10, because the patient may need to use pump 10 while bathing. Since the pump is sealed, exposure of the pump to water in a shower or bath will not cause damage to the internal components of the pump. The opening into the battery compartment must also be sealed to prevent leakage of water or liquid into battery compartment 10.

Since it may be necessary to change batteries 16 at relatively frequent intervals, battery compartment cover 12 must be easily removed from pump 10 to provide access to battery compartment 14. Once the battery compartment cover is removed, batteries 16 can easily be removed from the battery compartment and replaced.

To facilitate removal of the battery compartment cover from pump 10, it is provided with a lever 18 that is pivotable between a closed position and an open position. The lever is placed in its closed position to seat and seal the battery compartment cover within the opening into pump 10, and is moved to its open position, to enable the battery compartment cover to be easily pulled from the battery compartment so that the batteries contained therein can be accessed and serviced.

Details of the battery compartment cover are shown in FIGS. 2–7. The battery compartment cover includes a movable plunger 22 that is adapted to be inserted within the opening into the battery compartment. A pin 20 couples lever 18 to a tab or post 24 that extends outward from plunger 22. Post 24 passes through an orifice 26 formed in the center of a supporting structure or washer 28 and extends beyond an outer surface of the washer so that pin 20 can pass through orifices 32 disposed on each side of lever 18 and through an orifice 25 in post 24. Post 24 is disposed between the opposed sides of lever 18, and orifice 25 is aligned with orifices 32 to facilitate insertion of pin 20. Either orifices 32 or orifice 25 are/is preferably sufficiently small in diameter relative to the diameter of pin 20 so that friction between the orifice(s) and the pin holds the pin in place. The other orifices are sufficiently larger in diameter than the pin to permit free pivotal movement of lever 18 relative to post 24.

Washer 28 includes a tubular portion 38 that defines a central opening 36 through which post 24 is inserted. Around the outer surface of tubular portion 38 is disposed a shoulder 34, which has a larger diameter than that of the tubular portion. On the outwardly extending surface of washer 28 is disposed a tang 30. The tang extends outwardly, adjacent central opening 36 in washer 28. Tang 30 has a semicircular cross section and is of sufficient size to generally fill the void adjacent lever 18. When the lever is in its closed position, the outer surface of lever 18, the outer end of post 24, and the outer surface of tang 30 forms a generally planar surface. A flange 35 extends outwardly adjacent to shoulder 34 and has a sufficiently large diameter to prevent washer 28 from being completely inserted into the opening of battery compartment 14.

When the cover is assembled, an end 23 of plunger 22 abuts against an O-ring 40, which has an internal diameter approximately equal to the external diameter of tubular portion 38. When assembling the battery compartment cover, O-ring 40 is slid over tubular portion 38, into contact with shoulder 34. An annular portion 42 of plunger 22 defines an annular groove 43 adjacent to post 24. Tubular portion 38 of washer 28 fits into annular groove 43, around post 24. Once pin 20 has been inserted through orifices 32 on lever 18 and orifice 25 on post 24, O-ring 40 is trapped between shoulder 34 on washer 28 and end 23 on plunger 22. The significance of the disposition of washer 40 relative to plunger 22 is discussed below.

Plunger 22 also includes a central cylindrical portion 46 disposed on the end of the plunger opposite post 24. Within the central cylindrical portion is disposed an orifice 48. A rectangular slot 44 is formed in the side of plunger 22.

To provide an electrical contact for batteries 16, a helical spring 56 is fastened to central cylindrical portion 46 of plunger 22 using a threaded fastener 60 that is threaded into orifice 48. Threaded fastener 60 passes through a reduced diameter loop 58 on helical spring 56 and then through an orifice 54, which is disposed in the center of a metal washer 50. Extending from one side of metal washer 50 is a wiper contact 52. As assembled, wiper contact 52 is seated within rectangular slot 44 of plunger 22 and washer 50 is affixed atop central cylindrical portion 46. Fastener 60 holds both helical spring 56 and metal washer 50 in place on plunger 22.

Optionally, an elastomeric tether 62 (preferably formed of a polypropylene plastic) is also fastened to plunger 22 using threaded fastener 60. The threads on threaded fastener 60 are relatively coarse, to engage the inner surface of orifice 48 in plunger 22, cutting corresponding threads on the inner surface. Alternatively, a threaded metal insert can be provided in orifice 48.

Plunger 22 is formed of a plastic material as are washer 28 and lever 18. If tether 62 is used, fastener 60 passes through an orifice 64 in the end of the tether, which is disposed between the undersurface of metal washer 50 and center cylindrical portion 46 of plunger 22. The other end of tether 62 includes a tab 66, which is connected to the interior surface of battery compartment 14 (sliding into a slot that is provided therefore—not shown). The purpose of tether 62 is to prevent battery compartment cover 12 from being misplaced when it is removed from the opening into the battery compartment of pump 12. Accordingly, tether 62 must be sufficiently flexible so that when the battery compartment cover is inserted and secured in placed on pump 10, the tether does not interfere with the disposition of battery 16 or with the contact between helical spring 56 and adjacent battery 16 (FIG. 1). Wiper contact 52 makes electrical contact with a terminal 76, which is disposed on or simply part of an inner surface 74 of battery compartment 14 when battery compartment cover 12 is secured in place on pump 10.

Figure 5:
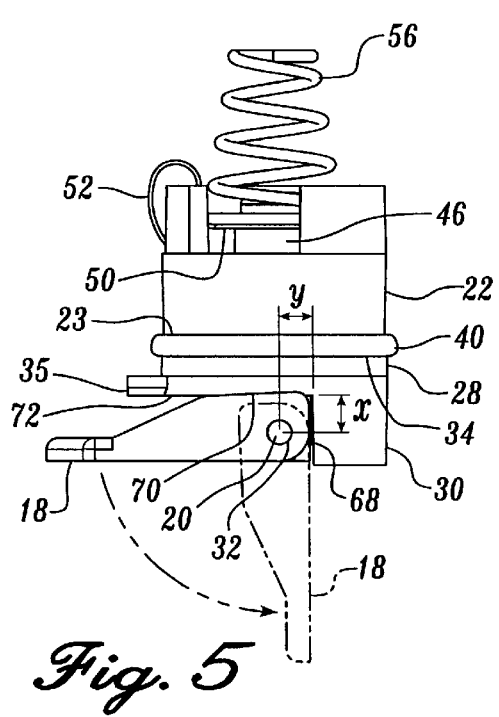
FIG. 5 is a side elevational view of the battery compartment cover, showing a position of a lever (solid lines) when the battery compartment cover is used for sealing the opening and a position of the lever (dash-dot lines) when the cover is being removed from the opening.
Figure 6:
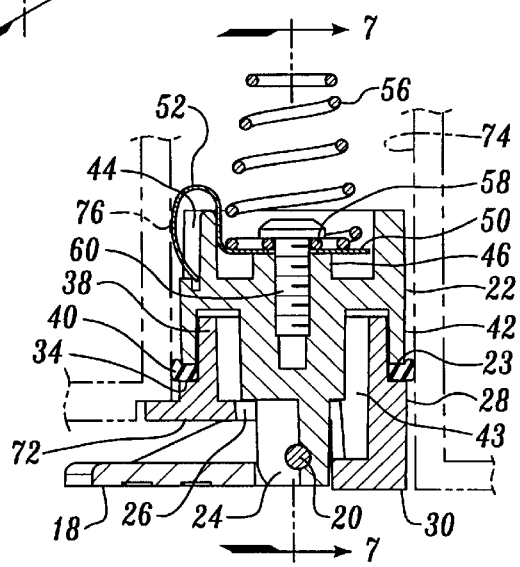
FIG. 6 is a cross-sectional elevational view of the battery compartment cover, taken along section lines 6—6 in FIG. 4.
Figure 7:
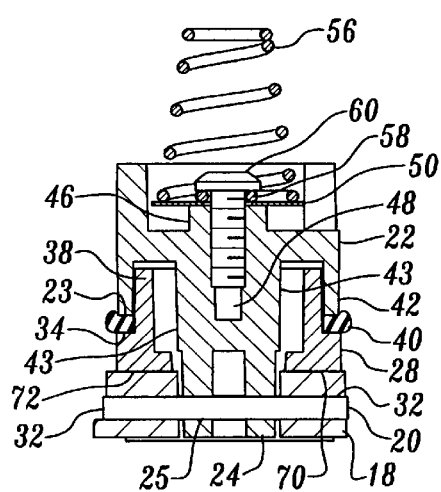
FIG. 7 is a cross-sectional elevational view of the battery compartment cover, taken along section lines 7—7 in FIG. 6.

As best shown in FIG. 5, lever 18 includes an end 68 and a bottom surface 70. End 68 is spaced apart from a center of pin 20 a distance y, while bottom surface 70 is spaced apart from the center of pin 20 a distance x. As will be evident from this Figure, distance x is substantially greater than distance y. When lever 18 is in its closed position, bottom surface 70 is in contact with outer surface 72 of washer 28. However, when lever 18 is pivoted around pin 20 to its vertical position, end 68 is in contact with outer surface 72 of washer 28. The relative distances x and y control the amount of force exerted by end 23 of plunger 22 against O-ring 40 in a direction toward shoulder 34 on washer 28. It will be apparent that as lever 18 is rotated to its open position, i.e., so that the lever is vertical or perpendicular to outer surface 72 of washer 28, O-ring 40 experiences relatively little compression.

The internal diameter of the opening into battery compartment 14 is approximately equal to that of O-ring 40 when the O-ring is not being compressed. However, movement by the user of lever 18 into its closed position substantially compresses O-ring 40 between end 23 of plunger 22 and shoulder 34 of washer 28. This compressive force causes the O-ring to expand radially outward, sealing the opening into battery compartment 14; also, the increased friction between the O-ring and the inner surface of the battery compartment opening tends to block the battery compartment cover into its position within the opening so that a watertight seal is formed between the battery compartment cover and the opening into the battery compartment at the O-ring. When the user pivots lever 18 into the vertical position (as shown in the phantom view by the dash-dot lines) so that the lever is generally perpendicular to outer surface 72 of washer 28, the compressive force on O-ring 40 is released, permitting the battery compartment cover to be readily withdrawn from the opening into the battery compartment to facilitate replacing or servicing batteries 16.

In addition, when lever 18 is vertically oriented, the user can readily grasp the lever between a thumb and forefinger to facilitate withdrawal of battery compartment cover 12 from the opening into the battery compartment or for reinsertion of the battery compartment cover back into the opening after the batteries have been replaced or serviced. The extent of the compression of O-ring 40 is controlled by the distance x, since as distance x increases relative to distance y, a greater amount of compression force is applied to O-ring 40. Since end 68 and bottom surface 70 are relatively flat, these surfaces acting against outer surface 72 of the washer tend to resist pivotal rotation of the lever about the pivot pin, i.e., the shape of the lever acts like a detent for the open and closed positions of the lever.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A battery compartment cover for sealing an opening into a battery compartment that is disposed within a housing of a portable battery powered device, comprising:

(a) a supporting member having:
      (i) an inner portion shaped and sized to fit within the opening into the battery compartment;
      (ii) an outer portion shaped and sized to overlie the opening into the battery compartment; and
      (iii) an aperture disposed within the outer portion and extending through the inner portion of the supporting member;

(b) an elastomeric seal disposed around the inner portion of the supporting member;

(c) a plunger shaped and sized to fit within the opening into the battery compartment and having:
      (i) a shoulder disposed at one end, said shoulder being sized to abut against one side of the elastomeric seal; and
      (ii) a tab disposed at said one end of the plunger, surrounded by said shoulder, said tab extending through the aperture of the supporting member, through the inner portion to the outer portion of the supporting member; and (d) a lever pivotally coupled to the tab and rotatable between a first position and a second position, rotation of said lever from the second position to the first position drawing said tab and said plunger toward the outer portion of the supporting member so that when said battery compartment cover is disposed within the opening of the battery compartment and said lever has been rotated to the first position, the elastomeric seal is compressed between the shoulder and the outer portion of the supporting member, causing the elastomeric seal to expand radially within the opening, forming a substantially watertight seal between the inner portion of the supporting member and the opening into the battery compartment, and thereafter, when said lever is rotated from the first position to the second position, a force applied by the shoulder against the elastomeric seal is substantially reduced, enabling the battery compartment cover to be readily removed from the opening into the battery compartment.

2. The battery compartment cover of claim 1, further comprising a spring disposed on an end of the plunger opposite that on which the tab is disposed, said spring providing an electrical contact adapted to engage a terminal of a battery when the plunger is disposed within the opening of the battery compartment.

3. The battery compartment cover of claim 2, further comprising an electrical wiper that is mechanically and electrically coupled to the spring, said electrical wiper extending to a periphery of the plunger and being adapted to electrically couple with a terminal on the housing of the portable battery powered device when the plunger is inserted within the opening.

4. The battery compartment cover of claim 3, further comprising a fastener that connects the electrical wiper and the spring to the plunger.

5. The battery compartment cover of claim 1, further comprising a flexible tether that is coupled to the plunger and is adapted to connect to an interior point within the battery compartment, said flexible tether securing the battery compartment cover to the housing to prevent the battery compartment cover from being inadvertently misplaced, while enabling the battery compartment cover to be removed to access the interior of the battery compartment, to facilitate removing or inserting a battery therein.

6. The battery compartment cover of claim 1, further comprising a pivot pin that extends through the lever and through the tab, forming a pivot joint between the lever and the tab.

7. The battery compartment cover of claim 1, wherein the elastomeric seal comprises an O-ring.

8. The battery compartment cover of claim 1, wherein when in the second position, the lever is generally aligned with a longitudinal axis of the plunger, and when in the first position, the lever is generally transverse to said longitudinal axis.

9. The battery compartment cover of claim 1, wherein a surface of the lever rides against a surface of the outer portion of the supporting member as the lever is rotated between to the first position and the second position, a distance between a center of rotation of the lever and a point on said surface of the lever that rides on the surface of the outer portion of the supporting member increasing as the lever is rotated from the second position to the first position.

10. The battery compartment cover of claim 9, wherein the lever has a generally flat end and a flat side that contact the surface of the outer portion of the supporting member, a shape of the lever thus tending to resist rotation of the lever between the second position and the first position.

11. A battery compartment cover for sealing an opening into a battery compartment of a battery powered medical device that may be exposed to a liquid, comprising:

(a) a plug having a cross-sectional size and shape to enable the plug to fit within the opening of the battery compartment and a supporting surface that is larger than the opening and overlies the opening when the plug is inserted therein;

(b) an elastomeric ring fitted around the plug and disposed against a shoulder that extends around a periphery of the plug;

(c) said plug also including a movable plunger that moves generally along a longitudinal axis of the plug, one end of said movable plunger having a sleeve that abuts against the elastomeric ring; and (d) a lever that is disposed adjacent the supporting surface of the plug and coupled to the plunger, rotation of the lever about a pivot point drawing the movable plunger against the elastomeric ring, compressing the elastomeric ring so that it expands radially outward into sealing contact with a surface defined by the opening, thereby sealing the opening so as to prevent a liquid from entering the battery compartment.

12. The battery compartment cover of claim 11, wherein said lever is pivotally connected to said plunger by a pivot pin that passes through an orifice formed in an end of the plunger and through an orifice formed in the lever, said end of the plunger extending through an aperture formed in the plug.

13. The battery compartment cover of claim 11, further comprising an electrical contact connected to an inner end of the plug, said electrical contact being adapted to electrically couple a terminal of a battery to a terminal within the medical device when the plug is inserted into the opening of the battery compartment.

14. The battery compartment cover of claim 13, further comprising a fastener that connects the electrical contact to the plug.

15. The battery compartment cover of claim 11, further comprising a flexible cord that connects the plug to the medical device to prevent the battery compartment cover from being misplaced when the plug is not inserted into the opening of the battery compartment.

16. The battery compartment cover of claim 11, wherein the movable plunger includes an annular groove that is circumscribed by the shoulder, a central portion of the movable plunger defining a radially inner surface of the annular groove and extending through an aperture formed in the outer surface of the plug, to connect with the lever.

17. Apparatus for sealingly enclosing a battery within a portable device, comprising:

(a) a housing that defines a battery compartment having an opening for insertion and removal of the battery; and (b) a cover for sealing closing the opening, said cover comprising:
(i) a plug sized to fit within the opening;
(ii) an elastomeric seal fitted around the plug;
(iii) a lever that is pivotally mounted adjacent to an external surface of the plug; and
(iv) a plunger that is moved by pivoting the lever into compressive contact with the elastomeric seal, causing the seal to expand radially outward within the opening, sealing the opening.

18. The apparatus of claim 17, wherein the plunger is pivotally coupled to the lever, so that rotation of the lever from a first position to a second position releases the compression of the elastomeric seal to enable the cover to be removed.

19. The apparatus of claim 17, wherein the elastomeric seal comprises an O-ring seated against a shoulder formed on the plug.

20. The apparatus of claim 17, further comprising an electrical conductor mounted on the plunger that is adapted to electrically couple to a battery disposed within the compartment and to a terminal on the portable device.

21. The apparatus of claim 17, further comprising a tether for connecting the cover to the housing of the portable device.

* * * * *